(12) United States Patent
Osuka (10) Patent No.: US 12,119,713 B2
(45) Date of Patent: Oct. 15, 2024

(54) ROTOR AND ROTOR MANUFACTURING METHOD

(71) Applicant: AISIN CORPORATION, Aichi (JP)

(72) Inventor: Shinya Osuka, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/769,213

(22) PCT Filed: Dec. 24, 2020

(86) PCT No.: PCT/JP2020/048574
§ 371 (c)(1),
(2) Date: Apr. 14, 2022

(87) PCT Pub. No.: WO2021/176818
PCT Pub. Date: Sep. 10, 2021

(65) Prior Publication Data
US 2024/0120790 A1    Apr. 11, 2024

(30) Foreign Application Priority Data

Mar. 4, 2020 (JP) ................................. 2020-036617

(51) Int. Cl.
| | |
|---|---|
| *H02K 1/30* | (2006.01) |
| *H02K 1/2706* | (2022.01) |
| *H02K 7/00* | (2006.01) |
| *H02K 7/08* | (2006.01) |
| *H02K 15/03* | (2006.01) |
| *H02K 24/00* | (2006.01) |

(52) U.S. Cl.
CPC ............. *H02K 1/30* (2013.01); *H02K 1/2706* (2013.01); *H02K 7/003* (2013.01); *H02K 7/083* (2013.01); *H02K 15/03* (2013.01); *H02K 24/00* (2013.01)

(58) Field of Classification Search
CPC ........ H02K 1/30; H02K 1/2706; H02K 7/003; H02K 7/083; H02K 15/03; H02K 24/00
USPC ..................................................... 310/156.12
See application file for complete search history.

(56) References Cited

FOREIGN PATENT DOCUMENTS

| DE | 10 2018 009832 A1 | 6/2019 |
|---|---|---|
| EP | 2 819 277 A1 | 12/2014 |
| JP | 6162020 B2 | 7/2017 |

OTHER PUBLICATIONS

Dec. 2, 2022 Extended European Search Report issued in European Patent Application No. 20922888.1.
Mar. 23, 2021 Search Report issued in International Patent Application No. PCT/JP2020/048574.

*Primary Examiner* — Terrance L Kenerly
(74) *Attorney, Agent, or Firm* — Oliff PLC (57) ABSTRACT

A first shaft member of a shaft included in this rotor includes: a first large-diameter portion disposed radially inward of a rotor core; and a first small-diameter portion disposed on a first axial side relative to the rotor core. The first small-diameter portion is provided with a driving force transmitter to transmit a driving force, which is transmitted thereto from the rotor core, to a driving force transmission member. A portion of the first shaft member located on a second axial side is connected to a second shaft member of the shaft.

13 Claims, 6 Drawing Sheets

ROTOR AND ROTOR MANUFACTURING METHOD

TECHNICAL FIELD

The present disclosure relates to rotors and rotor manufacturing methods.

BACKGROUND ART

Rotors each including a shaft that includes a plurality of shaft members and methods for manufacturing such rotors are known in the related art. Such rotor and rotor manufacturing method are disclosed in, for example, Japanese Patent No. 6162020. Japanese Patent No. 6162020 discloses a motor shaft included in a rotor together with a motor core. The motor shaft includes a first member and a second member. The first member is secured to the motor core. The first member includes a hollow portion and a solid portion. With an end face of the hollow portion of the first member in abutment with an end face of the second member, the end face of the hollow portion is connected to the end face of the second member. The second member is provided with spline grooves. A driving force is transmitted from the motor core to a driving force transmission member through the first member, a junction of the first and second members, and the second member.

Related Art Documents

PATENT DOCUMENTS

Patent Document 1: Japanese Patent No. 6162020

SUMMARY OF THE DISCLOSURE

Problem to be Solved by the Disclosure

Japanese Patent No. 6162020 discloses that the driving force (torque) is transmitted from the motor core to the driving force transmission member through the first member, the junction of the first and second members, and the second member. Thus, stress may unfortunately concentrate on the junction because the junction is included in a driving force transmission path (torque transmission path). Specifically, performing welding or other process on the junction may complicate its shape, causing stress to concentrate on the junction relatively susceptible to stress concentration. This requires the first member, the second member, and the junction to be increased in size in order for the junction (which is included in the motor shaft) to have sufficient mechanical strength. Accordingly, the motor shaft (which is included in the rotor) disclosed in Japanese Patent No. 6162020 disadvantageously involves an increase in size of the first member (first shaft member), the second member (second shaft member), and the junction (connection) of the first and second members because the first and second members are connected to each other. As used herein, the term "increase in size" conceptually refers to, for example, not only an increase in outside diameter but also an increase in thickness (thickening).

This disclosure has been made in view of the above-described problems. An object of this disclosure is to provide a rotor that would prevent a first member, a second member, and a connection from increasing in size while allowing a shaft to have sufficient mechanical strength, if the shaft is provided by connecting the first member to the second member through the connection.

Means for Solving the Problem

To achieve the above object, a rotor according to a first aspect of this disclosure includes: a cylindrical rotor core including a first end face located on a first axial side and a second end face located on a second axial side; and a shaft that rotates together with the rotor core. The shaft includes: a first shaft member integrally including a first large-diameter portion having a hollow shape and disposed radially inward of the rotor core, and a first small-diameter portion disposed on the first axial side relative to the first end face of the rotor core and continuous with the first large-diameter portion; and a second shaft member including a second small-diameter portion disposed on the second axial side relative to the second end face of the rotor core. At least a part of the first small-diameter portion of the first shaft member and at least a part of the second small-diameter portion of the second shaft member each have an outside diameter smaller than an inside diameter of the rotor core. The first large-diameter portion of the first shaft member includes a driving force transmission outer peripheral surface which is in abutment with an inner peripheral surface of the rotor core and to which a driving force is to be transmitted from the rotor core. The first small-diameter portion of the first shaft member is provided with a driving force transmitter to transmit the driving force, which is transmitted thereto from the rotor core through the driving force transmission outer peripheral surface, to a driving force transmission member. A portion of the first shaft member located on the second axial side is provided with a connection connected to the second shaft member. The connection is located on the second axial side relative to an end of the driving force transmission outer peripheral surface located on the second axial side. As used herein, the term "connect" refers to a broad concept including not only making connection(s) by welding and making connection(s) by swaging but also making connection(s) by pressure welding carried out by shrink fitting or cooling fitting.

As described above, the shaft of the rotor according to the first aspect of this disclosure includes the first shaft member and the second shaft member. The first small-diameter portion of the first shaft member is provided with the driving force transmitter to transmit the driving force, which is transmitted thereto from the rotor core, to the driving force transmission member. The portion of the first shaft member located on the second axial side is provided with the connection connected to the second shaft member. The connection is located on the second axial side relative to the end of the driving force transmission outer peripheral surface located on the second axial side. The connection is thus provided on the second shaft member instead of on a driving force transmission path between the rotor core and the driving force transmitter of the first shaft member, making it possible to prevent concentration of stress on the connection. This eliminates the need to increase the first shaft member, the second shaft member, and the connection in size unlike when the connection is provided on the driving force transmission path. Consequently, if the shaft is provided by connecting the first shaft member to the second shaft member through the connection, the first aspect of this disclosure would be able to prevent the first shaft member, the second shaft member, and the connection from increasing in size while allowing the shaft to have sufficient mechanical strength.

A rotor manufacturing method according to a second aspect of this disclosure includes: a first shaft member preparing step involving preparing a first shaft member of a shaft that rotates together with a rotor core, the first shaft member integrally including a first large-diameter portion having a hollow shape and disposed radially inward of the rotor core having a cylindrical shape, and a first small-diameter portion disposed on a first axial side relative to a first end face of the rotor core located on the first axial side, the first small-diameter portion being continuous with the first large-diameter portion, at least a part of the first small-diameter portion having an outside diameter smaller than an inside diameter of the rotor core; a second shaft member preparing step involving preparing a second shaft member of the shaft, the second shaft member including a second small-diameter portion disposed on a second axial side relative to a second end face of the rotor core located on the second axial side, at least a part of the second small-diameter portion having an outside diameter smaller than the inside diameter of the rotor core; a driving force transmitter providing step involving providing a driving force transmitter on the first small-diameter portion of the first shaft member, the driving force transmitter being configured to transmit a driving force to a driving force transmission member, the driving force being transmitted to the driving force transmitter from the rotor core through a driving force transmission outer peripheral surface of the first large-diameter portion in abutment with an inner peripheral surface of the rotor core; a connecting step involving connecting the second shaft member to a portion of the first shaft member located on the second axial side by welding at a position located on the second axial side relative to an end of the driving force transmission outer peripheral surface of the first large-diameter portion located on the second axial side; and a securing step involving securing the shaft to the rotor core.

As described above, the rotor manufacturing method according to the second aspect of this disclosure includes: the driving force transmitter providing step involving providing the driving force transmitter on the first small-diameter portion of the first shaft member, the driving force transmitter being configured to transmit the driving force from the rotor core to the driving force transmission member; and the connecting step involving connecting the second shaft member to the second axial side portion of the first shaft member at the position located on the second axial side relative to the second axial side end of the driving force transmission outer peripheral surface of the first large-diameter portion. A connection is thus provided on the second shaft member instead of on a driving force transmission path between the rotor core and the driving force transmitter of the first shaft member, making it possible to prevent concentration of stress on the connection. This eliminates the need to increase the first shaft member, the second shaft member, and the connection in size unlike when the connection is provided on the driving force transmission path. Consequently, if the shaft is provided by connecting the first shaft member to the second shaft member through the connection, the second aspect of this disclosure would provide the rotor manufacturing method that is able to prevent the first shaft member, the second shaft member, and the connection from increasing in size while allowing the shaft to have sufficient mechanical strength.

Because the first shaft member and the second shaft member are connected to each other by welding, the number of components of the rotor is smaller than when the first shaft member and the second shaft member are connected to each other with a fastening member, for example.

Effects of the Disclosure

As described above, the present disclosure would prevent a first shaft member, a second shaft member, and a connection from increasing in size while allowing a shaft to have sufficient mechanical strength, if the shaft is provided by connecting the first shaft member to the second shaft member through the connection.

MODES FOR CARRYING OUT THE DISCLOSURE

One embodiment of the present disclosure will be described below with reference to the drawings.

Overall Structure of Rotor

Referring to FIGS. 1 to 4, a structure of a rotor 100 according to the present embodiment will be described. The rotor 100 is included in a rotary electric machine 102 together with a stator 101. The rotor 100 is connected to a driving force transmission member 103 provided on a driving force transmission path (power train) through which a driving force is to be transmitted between the rotary electric machine 102 and a load. The stator 101 includes a stator core 101a and coils 101b. The stator core 101a has an annular shape. The coils 101b are disposed on the stator core 101a.

As used herein, the term "axial direction" refers to a direction along a rotation axis C1 of the rotor 100 (which corresponds to a direction Z1 or a direction Z2). The term "circumferential direction" refers to a circumferential direction of the rotor 100 (which corresponds to a direction A1 or a direction A2). The term "radial direction" refers to a radial direction of the rotor 100. The term "radially inward" refers to being located in a direction R1 in the drawings. The term "radially outward" refers to being located in a direction R2 in the drawings. The term "first axial side" refers to being located in the direction Z1 in the drawings. The term "second axial side" refers to being located in the direction Z2 in the drawings.

Figure 2:
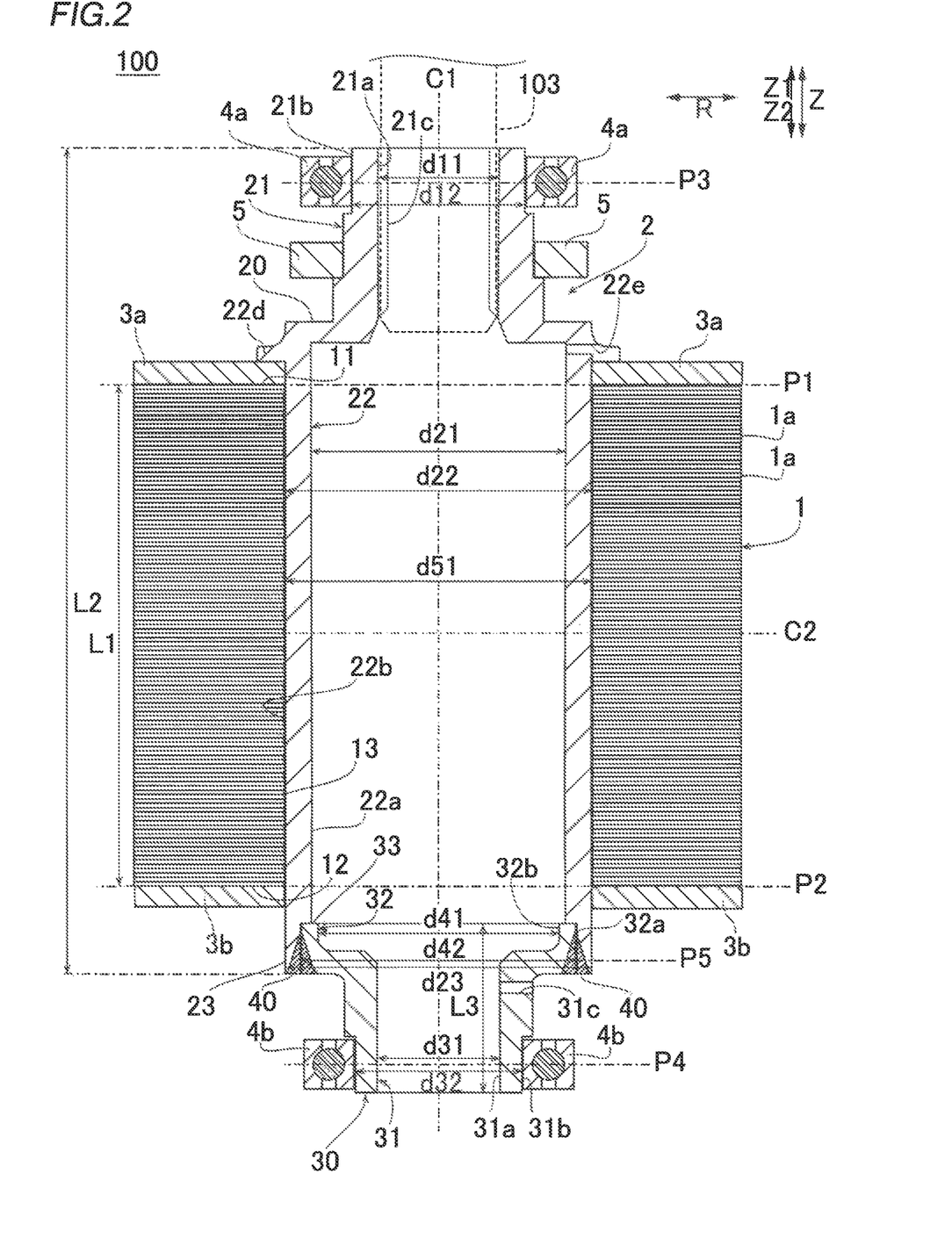
FIG. 2 is a schematic cross-sectional view of the rotor according to the present embodiment, taken along an axial direction.
Figure 3:
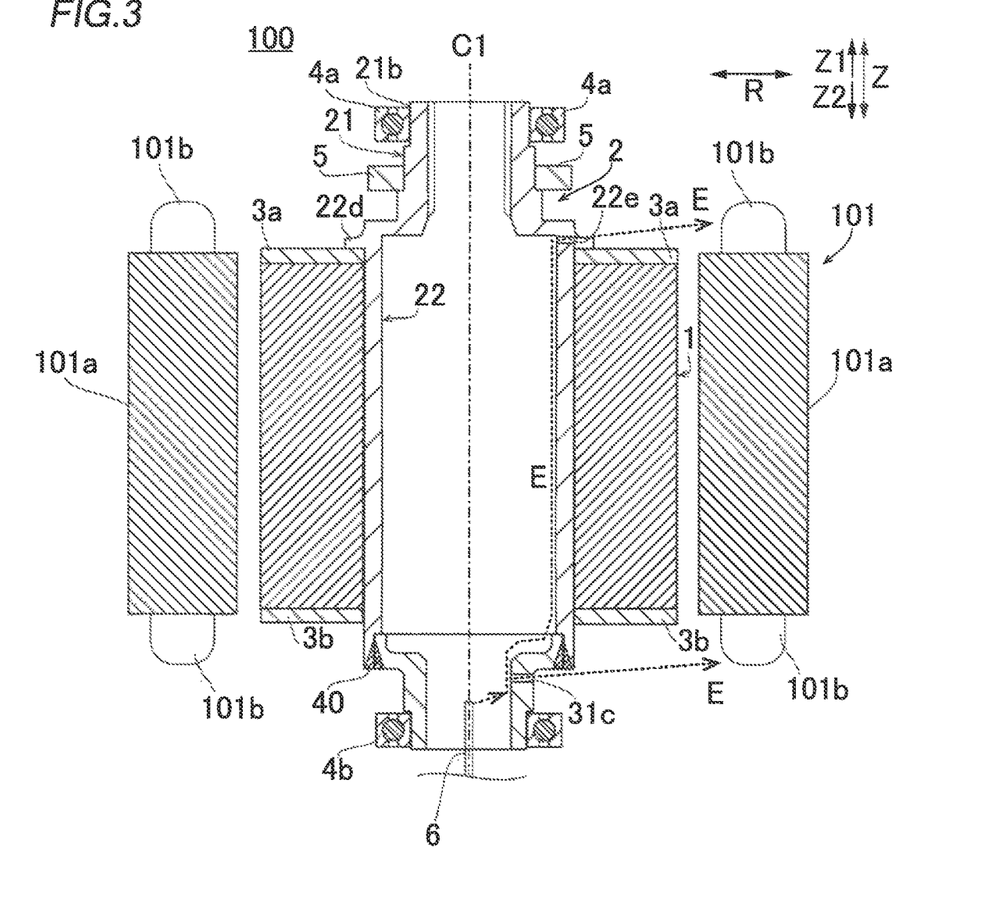
FIG. 3 is a diagram schematically illustrating how cooling oil is ejected in the present embodiment.

As illustrated in FIG. 2, the rotor 100 includes a rotor core 1, a shaft 2, end plates 3a and 3b, bearing members 4a and 4b, a rotational position detector 5, and an oil supplier 6 (see FIG. 3). The bearing member 4a is an example of a "first bearing member" in the claims. The bearing member 4b is an example of a "second bearing member" in the claims.

Structure of Rotor Core

Figure 1:
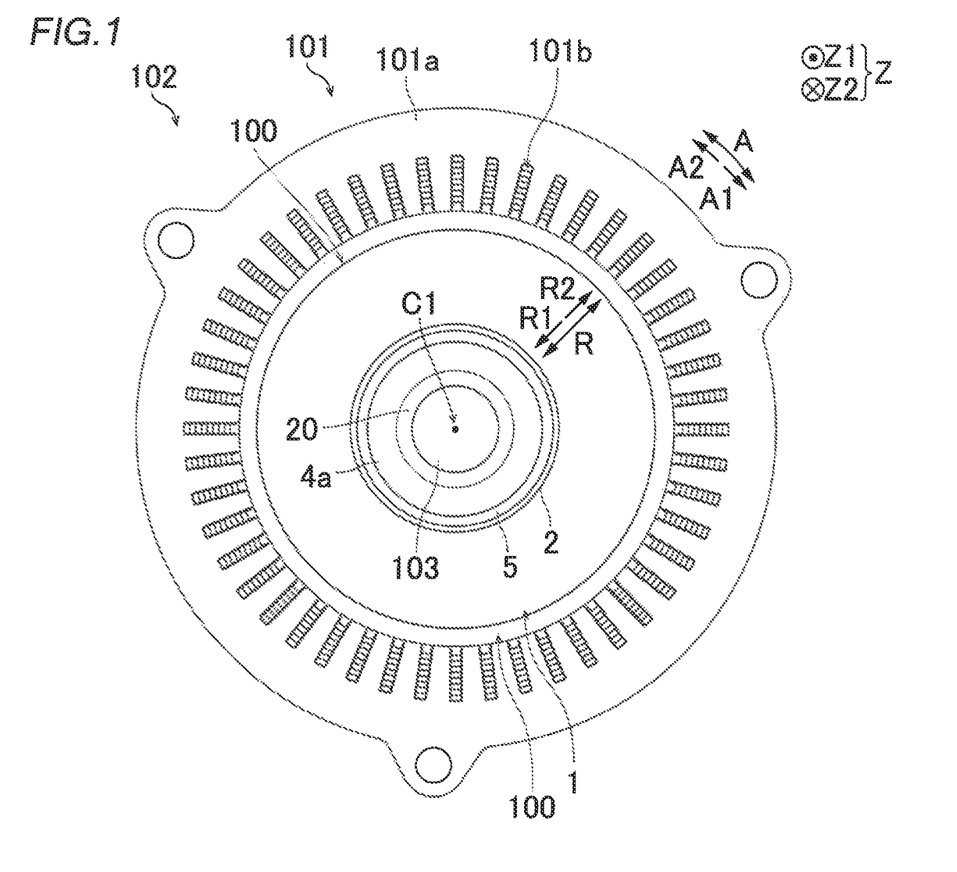
FIG. 1 is a plan view of a rotor (which is included in a rotary electric machine) according to one embodiment.

As illustrated in FIG. 1, the rotor core 1 has an annular shape (or cylindrical shape). The rotor core 1 is disposed radially inward of the stator core 101a. As illustrated in FIG. 2, the rotor core 1 includes a plurality of electromagnetic steel sheets 1a stacked in the axial direction. The rotor core 1 internally includes a permanent magnet (not illustrated) disposed therein. A length along which the electromagnetic steel sheets 1a of the rotor core 1 are stacked will be referred to as a "stacked length L1". As used herein, the term "stacked length L1" refers to a distance in a direction Z between a position P1 of an end face 11 of the rotor core 1 located in the direction Z1 and a position P2 of an end face 12 of the rotor core 1 located in the direction Z2. The end face 11 is an example of a "first end face" in the claims. The end face 12 is an example of a "second end face" in the claims.

The rotor core 1 is structured to interact with a magnetic field produced by passage of an electric current through the coils 101b of the stator 101 so as to generate a driving force (torque). In other words, the rotor core 1 produces a rotative force.

Structure of Shaft

The shaft 2 is a member that rotates around the rotation axis C1. Specifically, the shaft 2 is structured to rotate together with the rotor core 1, the end plates 3a and 3b, and the rotational position detector 5 with respect to the stator 101. The shaft 2 is provided by connecting a first shaft member 20 to a second shaft member through connection(s) 40. In other words, the shaft 2 includes a plurality of members. The first shaft member 20 is an example of a "first shaft member" in the claims. The second shaft member 30 is an example of a "second shaft member" in the claims.

Structure of First Shaft Member

As illustrated in FIG. 2, the first shaft member 20 is disposed radially inward of the rotor core 1 such that the first shaft member 20 extends to the first axial side of the rotor core 1. Specifically, the first shaft member 20 (or its large-diameter portion 22, which will be described below) has a hollow shape. The first shaft member has, for example, a hollow cylindrical shape extending along the rotation axis C1. The first shaft member 20 is made of, for example, carbon steel. The first shaft member is disposed to extend beyond the rotor core 1 in the direction Z1 from a position located in the direction Z1 relative to an axial center C2 of the rotor core 1. The first shaft member 20 has an axial length L2 longer than the length L1.

The first shaft member 20 is secured to an inner peripheral surface 13 of the rotor core 1. In one example, with the first shaft member 20 disposed on the inner peripheral surface 13 of the rotor core 1, an increase in diameter of the first shaft member narrows a gap between the first shaft member 20 and the rotor core 1, so that the first shaft member 20 is fitted (or pressure-welded) to the rotor core 1. To be more specific, with the first shaft member 20 disposed on the inner peripheral surface 13 of the rotor core 1, a hydroforming process is performed such that the first shaft member 20 is pressure-welded to the inner peripheral surface 13 of the first shaft member 20. As used herein, the term "increase in diameter" refers to a change to a larger outside diameter resulting from radial expansion of a member.

The first shaft member 20 includes a small-diameter portion 21 and the large-diameter portion 22 integral (or continuous) with each other. In other words, the small-diameter portion 21 is continuous with the large-diameter portion 22. The large-diameter portion 22 is disposed radially inward of the rotor core 1. The small-diameter portion 21 is disposed on the first axial side (or located in the direction Z1) relative to the end face 11 of the rotor core 1. The small-diameter portion 21 has an inside diameter d11. The small-diameter portion 21 has an outside diameter d12. As used herein, the term "inside diameter d11 of the small-diameter portion 21" refers to an inside diameter of a portion of an inner peripheral surface 21a of the small-diameter portion 21 located at an axial position P3 where the bearing member 4a is disposed, and the term "outside diameter d12 of the small-diameter portion 21" refers to an outside diameter of a portion of an outer peripheral surface 21b of the small-diameter portion 21 located at the axial position P3 where the bearing member 4a is disposed. The small-diameter portion 21 is an example of a "first small-diameter portion" in the claims. The large-diameter portion 22 is an example of a "first large-diameter portion" in the claims.

The large-diameter portion 22 has an inside diameter d21 larger than the inside diameter d11 of the small-diameter portion 21. The large-diameter portion 22 has an outside diameter d22 larger than the outside diameter d12 of the small-diameter portion 21. As used herein, the term "inside diameter d21 of the large-diameter portion 22" refers to an inside diameter of a portion of an inner peripheral surface 22a of the large-diameter portion 22 located in a region between the axial positions P1 and P2 where the rotor core 1 is disposed, and the term "outside diameter d22 of the large-diameter portion 22" refers to an outside diameter of a portion of an outer peripheral surface 22b of the large-diameter portion 22 located in the region between the axial positions P1 and P2 where the rotor core 1 is disposed. The outside diameter d12 of the small-diameter portion 21 is smaller than an inside diameter d51 of the rotor core 1. The outer peripheral surface 22b is in abutment with the inner peripheral surface 13 of the rotor core 1 such that a driving force is transmitted from the rotor core 1 to the outer peripheral surface 22b. The outer peripheral surface 22b is an example of a "driving force transmission outer peripheral surface" in the claims.

An extremity 23 of the large-diameter portion 22 located on the second axial side (or located in the direction Z2) has an outside diameter d23.

In the present embodiment, the small-diameter portion 21 is provided with a driving force transmitter 21c to transmit the driving force, which is transmitted thereto from the rotor core 1 through the outer peripheral surface 22b of the large-diameter portion 22, to the driving force transmission member 103. Specifically, the driving force transmitter 21c is provided in the form of splines (teeth or grooves) on the inner peripheral surface 21a of the small-diameter portion 21. The first shaft member 20 is structured such that, with the driving force transmission member 103 fitted to the driving force transmitter 21c, rotation of the first shaft member 20 together with the driving force transmission member 103 transmits the driving force from the rotor core 1 to the driving force transmission member 103 (load side). The first shaft member 20 is structured such that a rotative force is transmitted from the driving force transmission member 103 to the rotor core 1 during regeneration of energy from the load side.

The large-diameter portion 22 is integral with a part of the small-diameter portion 21 located in the direction Z2. The large-diameter portion 22 is provided with a flange 22d. The flange 22d is formed to protrude radially outward from the outer peripheral surface 22b of the large-diameter portion 22. A surface of the flange 22d located in the direction Z2 and a surface of the end plate 3a located in the direction Z1 face each other in the axial direction.

The large-diameter portion 22 is provided with a through hole 22e. The through hole 22e is disposed in a portion of the first shaft member 20 located in the direction Z1 relative to the rotor core 1. To be more specific, the through hole 22e is located in the direction Z1 relative to the axial position P1 of the end face 11 of the rotor core 1 located in the direction Z1. The through hole 22e is formed to pass through a portion of the flange 22d in the radial direction.

As illustrated in FIG. 3, the through hole 22e has the function of allowing cooling oil E to flow in the radially direction. The cooling oil E is, for example, an automatic transmission fluid (ATF). To be more specific, the cooling oil E is ejected into the shaft 2 from the oil supplier 6 disposed inside the shaft 2. Rotation of the shaft 2 exerts centrifugal force on the cooling oil E. This causes some of the cooling oil E to be ejected from a through hole 31c (which will be described below) of the second shaft member 30, so that the cooling oil E ejected reaches a portion of the stator 101 (or coil end portions of the coils 101b) located in the direction Z2. The cooling oil E thus cools the portion of the stator 101 located in the direction Z2. Although FIG. 3 illustrates how the cooling oil E is sprayed on the coil 101b located in the right side portion of FIG. 3, rotation of the rotor 100 sprays the cooling oil E also on the coil 101b located in the left side portion of FIG. 3.

The cooling oil E flows along the inner peripheral surface 22a of the first shaft member 20 so as to cool the rotor core 1. The cooling oil E is then ejected from the through hole 22e of the first shaft member 20, so that the cooling oil E ejected reaches a portion of the stator 101 (or coil end portions of the coils 101b) located in the direction Z1. The cooling oil E thus cools the portion of the stator 101 located in the direction Z1.

The rotor core 1 is secured to the outer peripheral surface 22b of the large-diameter portion 22. More specifically, during manufacture of the rotor 100, the large-diameter portion 22 of the first shaft member 20 is increased in diameter by a hydroforming process, thus securing the rotor core 1 and the shaft 2 to each other.

In the present embodiment, a part of the large-diameter portion 22 located in the direction Z2 is provided with the connection(s) 40 connected to the second shaft member 30. Specifically, the connection(s) 40 is/are provided on a part of the large-diameter portion 22 located in the direction Z2 relative to the position P2 of the end face 12 of the rotor core 1 located in the direction Z2. The connection(s) 40 is/are located on the second axial side relative to an end of the outer peripheral surface 22b of the large-diameter portion 22 located on the second axial side (or located in the direction Z2).

Structure of Second Shaft Member

As illustrated in FIG. 2, the second shaft member 30 is a component separate from the first shaft member 20 and disposed in the direction Z2 relative to the rotor core 1. To be more specific, the second shaft member 30 (including a small-diameter portion 31 and a large-diameter portion 32, which will be described below) is disposed in the direction Z2 relative to the end face 12 (or its position P2) of the rotor core 1 located in the direction Z2. The second shaft member 30 is disposed to extend in the direction Z2 beyond a position located in the direction Z2 relative to the rotor core 1. The second shaft member 30 has an axial length L3 shorter than the length L1 and shorter than the length L2.

In the present embodiment, the second shaft member 30 is made of a material lower in rigidity than the material of the first shaft member 20. In one example, the second shaft member 30 is made of carbon steel similarly to the first shaft member 20, but the amount of carbon contained in the second shaft member 30 is smaller than the amount of carbon contained in the first shaft member 20.

The second shaft member 30 has a hollow shape. The second shaft member 30 includes the small-diameter portion 31 and the large-diameter portion 32 integral with each other. In other words, the small-diameter portion 31 is continuous with the large-diameter portion 32. The large-diameter portion 32 is disposed on the first axial side (or located in the direction Z1) relative to the small-diameter portion 31. The small-diameter portion 31 has an inside diameter d31. The small-diameter portion 31 has an outside diameter d32. As used herein, the term "inside diameter d31 of the small-diameter portion 31" refers to an inside diameter of a portion of an inner peripheral surface 31a of the small-diameter portion 31 located at an axial position P4 where the bearing member 4b is disposed, and the term "outside diameter d32 of the small-diameter portion 31" refers to an outside diameter of a portion of an outer peripheral surface 31b of the small-diameter portion 31 located at the axial position P4 where the bearing member 4b is disposed. The small-diameter portion 31 is an example of a "second small-diameter portion" in the claims. The large-diameter portion 32 is an example of a "second large-diameter portion" in the claims.

The large-diameter portion 32 has an inside diameter d41 larger than the inside diameter d31 of the small-diameter portion 31. The large-diameter portion 32 has an outside diameter d42 larger than the outside diameter d32 of the small-diameter portion 31. As used herein, the term "inside diameter d41 of the large-diameter portion 32" refers to an inside diameter of an end of the large-diameter portion 32 located in the direction Z1 (or a part of the large-diameter portion 32 adjacent to the end). The term "outside diameter d42 of the large-diameter portion 32" refers to an outside diameter of a part of the large-diameter portion 22 located at an axial position P5 where the connection(s) 40 is/are provided (or an outside diameter of an extremity 33 of the large-diameter portion 32 located in the direction Z1). The outside diameter d42 of the extremity 33 of the large-diameter portion 32 located on the first axial side (or located in the direction Z1) is larger than the outside diameter d32 of the small-diameter portion 31 and smaller than the outside diameter d23 of the extremity 23 of the large-diameter portion 22 located on the second axial side (or located in the direction Z2). The outside diameter d32 of the small-diameter portion 31 is smaller than the inside diameter d51 of the rotor core 1.

In the present embodiment, the small-diameter portion 31, which is a portion of the second shaft member 30 located in the direction Z2 relative to the rotor core 1, is provided with the through hole 31c through which the cooling oil E flows in the radial direction. Specifically, the through hole 31c is provided in the direction Z2 relative to the axial position P5 of the connection(s) 40.

An outer peripheral surface 32a of the large-diameter portion 32 and the inner peripheral surface 22a of the large-diameter portion 22 of the first shaft member 20 are disposed to face each other in the radial direction. At least a portion of the outer peripheral surface 32a and at least a portion of the inner peripheral surface 22a are connected (e.g., welded) to each other through the connection(s) 40. An inner peripheral surface 32b of the large-diameter portion 32 of the second shaft member 30 is connected to the inner peripheral surface 22a of the large-diameter portion 22 of the first shaft member 20. The shaft 2 is thus structured such that the cooling oil E flows from the second shaft member 30 to the first shaft member 20.

Arrangement of Connection(s)

Figure 4:
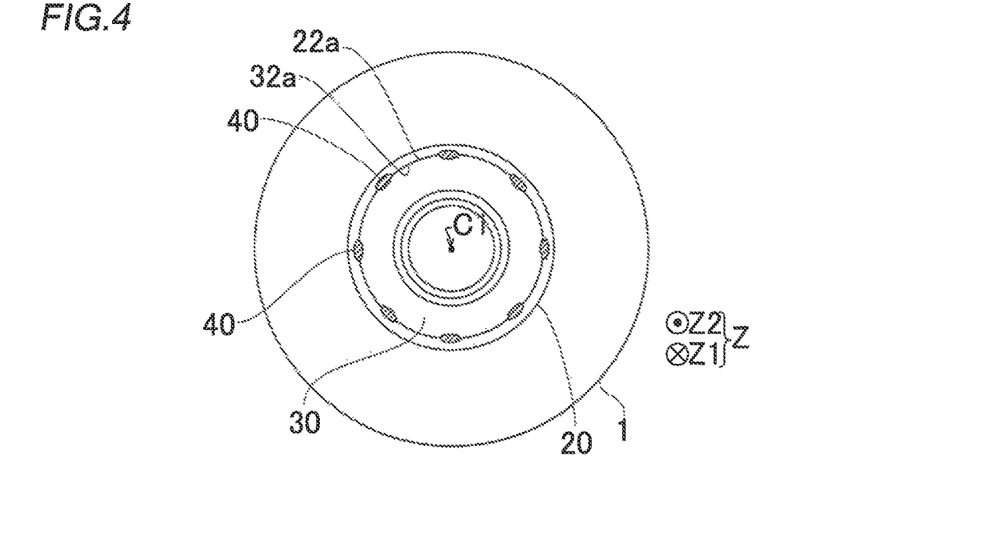
FIG. 4 is an axial view of the rotor, schematically illustrating connections according to the present embodiment.

As illustrated in FIG. 2, the connection(s) 40 is/are provided by welding the inner peripheral surface 22a of the first shaft member 20 to the outer peripheral surface 32a of the second shaft member 30. Specifically, the outer peripheral surface 32a of the extremity 33 of the large-diameter portion 32 located on the first axial side (or located in the direction Z1) is connected by welding to the inner peripheral surface 22a of the extremity 23 of the large-diameter portion 22 located on the second axial side (or located in the direction Z2). To be more specific, the connection(s) 40 is/are provided at the axial position P5 where the first shaft member 20 and the second shaft member 30 overlap with each other in the radial direction. As illustrated in FIG. 4, for example, the connections 40 are provided circumferentially separately as viewed in the direction Z1. In one example, the connections 40 are provided at equiangular intervals as viewed in the direction Z1. In FIG. 4, the bearing member 4b is not illustrated.

Providing the connection(s) 40 involves heating a portion of the first shaft member 20 and a portion of the second shaft member 30 such that these portions melt together, and then curing these portions. In one example, the connection(s) 40 may be provided by any of various welding methods, such as laser welding, electron beam welding, arc welding, and resistance welding.

Arrangement of End Plates

As illustrated in FIG. 2, the end plate 3a is disposed on the end face 11 of the rotor core 1 located on the first axial side (or located in the direction Z1). The end plate 3b is disposed on the end face 12 of the rotor core 1 located on the second axial side (or located in the direction Z2). In other words, the end plates 3a and 3b are disposed such that the rotor core 1 is sandwiched therebetween from both sides in the axial direction. The end plates 3a and 3b are each secured to the shaft 2 (or the first shaft member 20). In one example, the end plates 3a and 3b are swaged to the first shaft member 20.

The end plate 3b is provided at a position different from the axial position P5 of the connection(s) 40. Specifically, the end plate 3b is disposed in the direction Z2 relative to the axial position P2 of the end face 11 of the rotor core 1 located in the direction Z2, and is disposed in the direction Z1 relative to the axial position P5 of the connection(s) 40.

Arrangement of Bearing Members and Rotational Position Detector

As illustrated in FIG. 2, the bearing member 4a and the rotational position detector 5 are disposed on the small-diameter portion 21 of the first shaft member 20. The bearing member 4b is disposed on the small-diameter portion 31 of the second shaft member 30. The bearing members 4a and 4b are arranged to support the shaft 2 such that the shaft 2 is rotatable around the rotation axis C1. The bearing member 4a is provided on the outer peripheral surface 21b of the first shaft member 20 and is disposed at a position where at least a portion of the bearing member 4a overlaps with the driving force transmitter 21c as viewed in the radial direction. The bearing member 4a is disposed at the axial position P3 on the outer peripheral surface 21b of the small-diameter portion 21. The bearing member 4b is provided on a portion of the small-diameter portion 31 located in the direction Z2 relative to the axial position P5 of the connection(s) 40.

The rotational position detector 5 is provided on a portion of the outer peripheral surface 21b of the small-diameter portion 21 located closer to the rotor core 1 (or located in the direction Z2) relative to the axial position P3. The rotational position detector 5 is disposed on a portion of the first shaft member 20 located in the direction Z1 relative to the axial position P1 of the end face 11 of the rotor core 1. To be more specific, the rotational position detector 5 is provided on the outer peripheral surface 21b of the first shaft member 20 and is disposed at a position where at least a portion of the rotational position detector 5 overlaps with the driving force transmitter 21c as viewed in the radial direction. The rotational position detector 5 is configured to detect rotational positions of the rotor core 1.

The rotational position detector 5 is provided in the form of a resolver, for example. Specifically, the rotational position detector 5 is secured to the shaft 2 in the form of a rotor of the resolver. The rotational position detector 5 is configured to externally transmit rotational position information (signal) from a stator (not illustrated) of the resolver in accordance with relative positions of the rotor of the resolver and the stator of the resolver disposed radially outward of the rotor of the resolver.

Rotor Manufacturing Method

Figure 8:
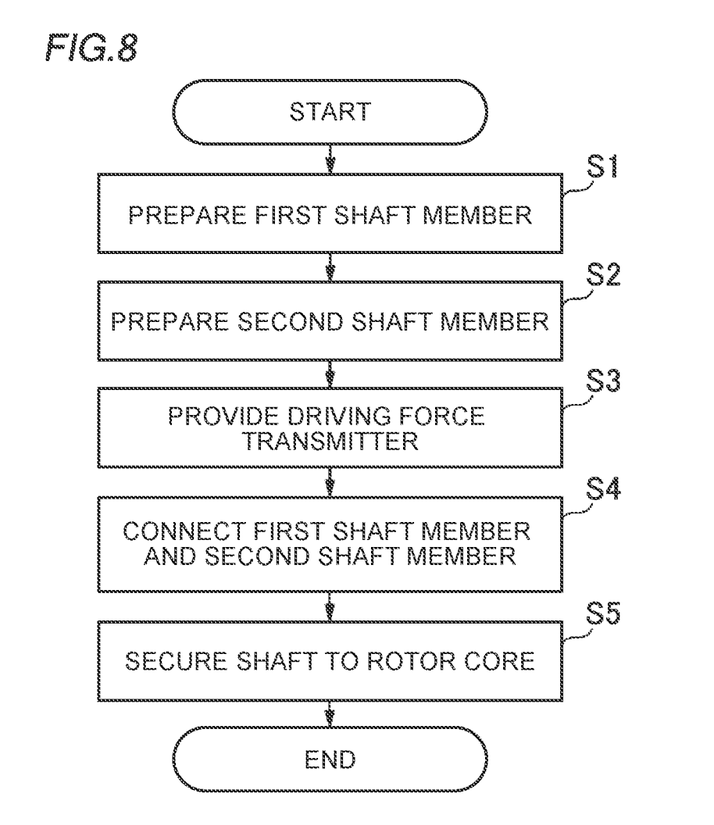
FIG. 8 is a flow chart illustrating a rotor manufacturing method according to the present embodiment.

As illustrated in FIG. 8, a method for manufacturing the rotor 100 includes steps for manufacturing the shaft 2, which include: a first shaft member preparing step (S1) involving preparing the first shaft member 20; a second shaft member preparing step (S2) involving preparing the second shaft member 30; a driving force transmitter providing step (S3) involving providing the driving force transmitter 21c on the small-diameter portion 21 of the first shaft member 20; and a connecting step (S4) involving connecting the second shaft member 30 to a portion of the first shaft member located on the second axial side (or located in the direction Z2). The method for manufacturing the rotor 100 further includes a securing step (S5) involving securing the shaft 2 to the rotor core 1. The first shaft member preparing step is an example of a "first shaft member preparing step" in the claims. The second shaft member preparing step is an example of a "second shaft member preparing step" in the claims.

In one example, the first shaft member preparing step, the second shaft member preparing step, the driving force transmitter providing step, and the connecting step, which are included in the steps for manufacturing the shaft 2, are performed in this order. Alternatively, these steps may be performed in any other order. In another example, the driving force transmitter providing step may be performed before the first shaft member preparing step and the second shaft member preparing step, or may be performed after the connecting step. In still another example, the first shaft member preparing step may be performed after the second shaft member preparing step, or may be performed simultaneously with the second shaft member preparing step.

The securing step (S5) is performed after the steps (S1 to S4) for manufacturing the shaft 2. The shaft 2 is secured to the rotor core 1 by, for example, hydroforming.

Effects of Present Embodiment

The present embodiment is able to achieve effects described below.

In the present embodiment, a first large-diameter portion (22) of a first shaft member (20) includes a driving force transmission outer peripheral surface (22b) which is in abutment with an inner peripheral surface (13) of a rotor core (1) and to which a driving force is to be transmitted from the rotor core (1) as described above. A first small-diameter portion (21) of the first shaft member (20) is provided with a driving force transmitter (21c) to transmit the driving force, which is transmitted thereto from the rotor core (1) through the driving force transmission outer peripheral surface (22b), to a driving force transmission member (103). A portion of the first shaft member (20) located on a second axial side is provided with a connection (40) connected to a second shaft member (30). The connection (40) is located on the second axial side relative to an end of the driving force transmission outer peripheral surface (22b) located on the second axial side. The connection (40) is thus provided on the second shaft member (30) instead of on a driving force transmission path between the rotor core (1) and the driving force transmitter (21c) of the first shaft member (20), making it possible to prevent concentration of stress on the connection (40). This eliminates the need to increase the first shaft member (20), the second shaft member (30), and the connection (40) in size unlike when the connection (40) is provided on the driving force transmission path. Consequently, if a shaft (2) is provided by connecting the first shaft member (20) to the second shaft member (30) through the connection (40), the present embodiment would be able to prevent the first shaft member (20), the second shaft member (30), and the connection (40) from increasing in size while allowing the shaft (2) to have sufficient mechanical strength.

In the present embodiment, the connection (40) is disposed on the second axial side relative to a second end face (12) of the rotor core (1) as described above. This arrangement enables an entirety of the driving force to be transmitted from the rotor core (1) to the first shaft member (20) provided with the driving force transmitter (21c) instead of to the second shaft member (30) provided with the connection (40). Accordingly, the present embodiment more effectively prevents the driving force (or torque) from being transmitted through the connection (40). Consequently, the present embodiment is able to more effectively prevent the first shaft member (20), the second shaft member (30), and the connection (40) from increasing in size while allowing the shaft (2) to have sufficient mechanical strength.

In the present embodiment, a first bearing member (4a) supporting the first shaft member (20) is disposed on the first small-diameter portion (21) of the first shaft member (20) as described above. A second bearing member (4b) supporting the second shaft member (30) is disposed on a second small-diameter portion (31) of the second shaft member (30). Because the first bearing member (4a) is disposed on the first small-diameter portion (21) and the second bearing member (4b) is disposed on the second small-diameter portion (31), this arrangement eliminates the need to increase the first bearing member (4a) and the second bearing member (4b) in diameter. Consequently, the present embodiment is able to prevent the first bearing member (4a) and the second bearing member (4b) from increasing in size.

In the present embodiment, the second shaft member (30) includes a second large-diameter portion (32) disposed on a first axial side relative to the second small-diameter portion (31) and continuous with the second small-diameter portion (31) as described above. An outside diameter (d42) of an extremity (33) of the second large-diameter portion (32) located on the first axial side is larger than an outside diameter (d32) of at least a part of the second small-diameter portion (31) and is smaller than an outside diameter (d23) of an extremity (23) of the first large-diameter portion (22) located on the second axial side. An outer peripheral surface (32a) of the extremity (33) of the second large-diameter portion (32) located on the first axial side is connected by welding to an inner peripheral surface (22a) of the extremity (23) of the first large-diameter portion (22) located on the second axial side. Suppose that a second side end face of the first shaft member (20) is welded to a first side end face of the second shaft member (30), and the first shaft member (20) and the second shaft member (30) each having a hollow shape are relatively small in thickness. In this case, a welding depth may be relatively shallow. This may result in a reduction in the mechanical strength of the connection (40). To solve this problem, the present embodiment involves providing the connection (40) by welding the inner peripheral surface (22a) of the extremity (23) of the first large-diameter portion (22) included in the first shaft member (20) to the outer peripheral surface (32a) of the extremity (33) of the second large-diameter portion (32) included in the second shaft member (30). The direction of welding depth thus corresponds to a direction along the axial direction of the first shaft member (20) and the second shaft member (30). Accordingly, the welding depth would be sufficient if the first shaft member (20) and the second shaft member (30) are relatively small in thickness. This results in sufficient mechanical strength of the connection (40). Unlike when the outer peripheral surface (22b) of the first shaft member (20) is welded to an inner peripheral surface (31a) of the second shaft member (30), the present embodiment is able to prevent the second shaft member (30) and the rotor core (1) disposed radially outward of the first shaft member (20) from mechanically interfering with each other.

In the present embodiment, a method for manufacturing a rotor (100) includes, as described above, a connecting step involving connecting the second shaft member (30) to a portion of the first shaft member (20) located on the second axial side by welding at a position located on the second axial side relative to an end of the driving force transmission outer peripheral surface (22b) of the first large-diameter portion (22) located on the second axial side. The connection (40) is thus provided on the second shaft member (30) instead of on the driving force transmission path between the rotor core (1) and the driving force transmitter (21c) of the first shaft member (20), making it possible to prevent concentration of stress on the connection (40). This eliminates the need to increase the first shaft member (20), the second shaft member (30), and the connection (40) in size unlike when the connection (40) is provided on the driving force transmission path. Consequently, if the shaft (2) is provided by connecting the first shaft member (20) to the second shaft member (30) through the connection (40), the present embodiment would provide the method for manufacturing the rotor (100), which is able to prevent the first shaft member (20), the second shaft member (30), and the connection (40) from increasing in size while allowing the shaft (2) to have sufficient mechanical strength.

Because the first shaft member (20) and the second shaft member (30) are connected to each other by welding, the number of components of the rotor (100) is smaller than when the first shaft member (20) and the second shaft member (30) are connected to each other with a fastening member, for example.

Variations

The embodiment disclosed herein is to be considered as not limitative but illustrative in all respects. The scope of the present disclosure is defined not by the description of the above embodiment but by the claims and includes all changes (or variations) falling within the meaning and range equivalent to the claims.

First Variation

Figure 5:
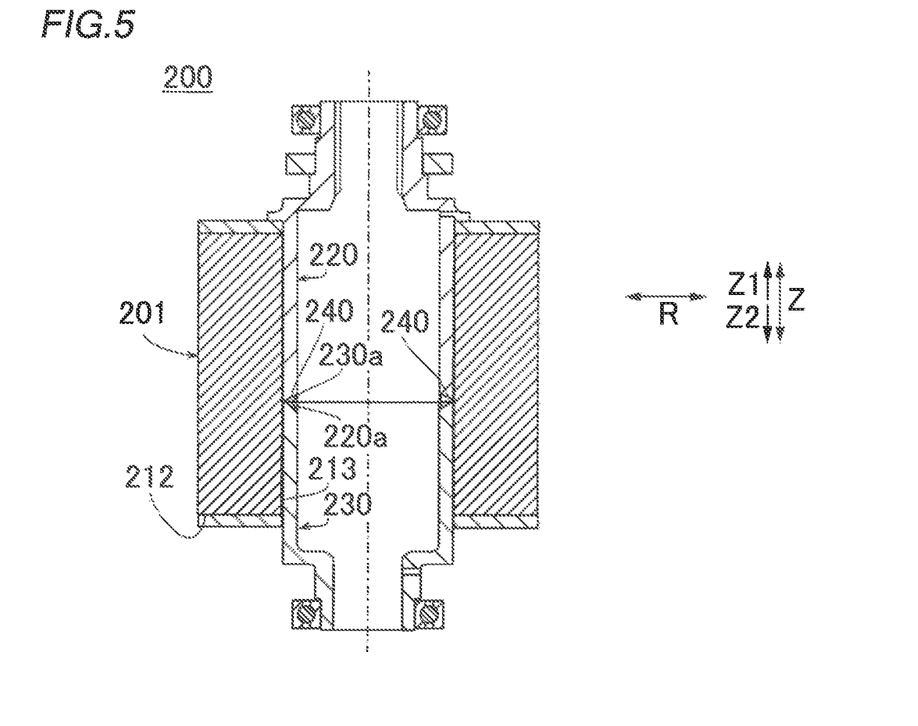
FIG. 5 is a cross-sectional view of a rotor according to a first variation of the present embodiment.

The above embodiment has illustrated an example where only the first shaft member 20 of the shaft 2 is secured to the inner peripheral surface 13 of the rotor core 1. The present disclosure, however, is not limited to this example. A rotor 200 according to a first variation illustrated in FIG. 5, for example, may involve securing not only a first shaft member 220 but also a second shaft member 230 to an inner peripheral surface 213 of a rotor core 201. In this case, a portion of the second shaft member 230 and a portion of the rotor core 201 are disposed to overlap with each other as viewed in the radial direction. The first shaft member 220 is an example of the "first shaft member" in the claims. The second shaft member 230 is an example of the "second shaft member" in the claims.

The above embodiment has illustrated an example where the connection(s) is/are provided in the direction Z2 relative to the end face 12 of the rotor core 1 located in the direction Z2. The present disclosure, however, is not limited to this example. The rotor 200 according to the first variation illustrated in FIG. 5, for example, involves providing connection(s) 240 located in the direction Z1 relative to an end face 212 of the rotor core 201.

The above embodiment has illustrated an example where the inner peripheral surface 22a of the first shaft member 20 is connected to the outer peripheral surface 32a of the second shaft member 30. The present disclosure, however, is not limited to this example. The rotor 200 according to the first variation illustrated in FIG. 5, for example, may involve connecting an end face 220a of the first shaft member 220 located in the direction Z2 to an end face 230a of the second shaft member 230 located in the direction Z1.

Second Variation

Figure 6:
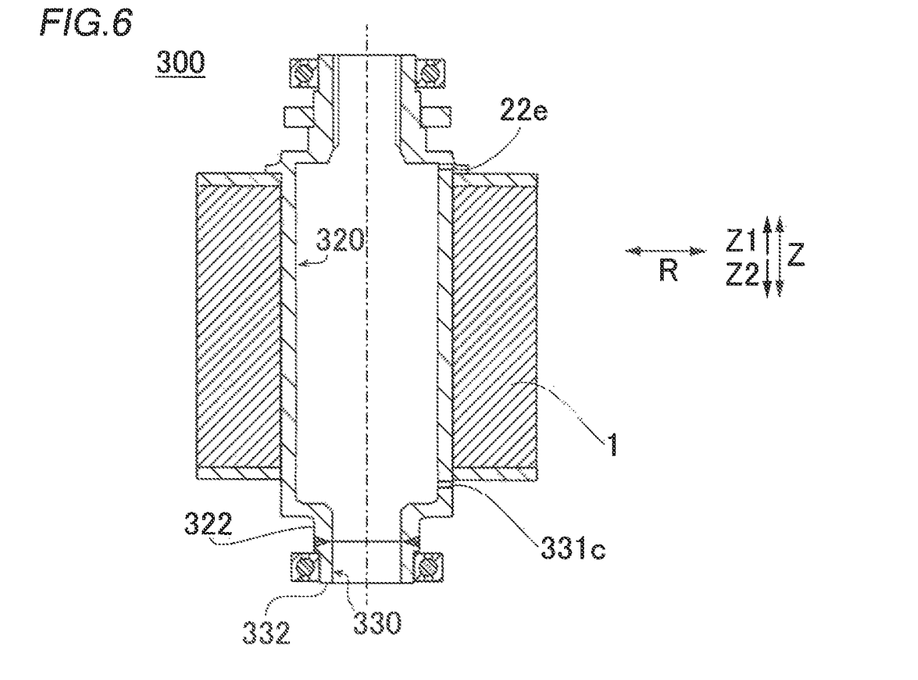
FIG. 6 is a cross-sectional view of a rotor according to a second variation of the present embodiment.

The above embodiment has illustrated an example where the large-diameter portion 22 of the first shaft member 20 is connected to the large-diameter portion 32 of the second shaft member 30. The present disclosure, however, is not limited to this example. A rotor 300 according to a second variation illustrated in FIG. 6, for example, may involve connecting a small-diameter portion 322 of a first shaft member 320 located in the direction Z2 to a small-diameter portion 332 of a second shaft member 330. The first shaft member 320 is an example of the "first shaft member" in the claims. The second shaft member 330 is an example of the "second shaft member" in the claims.

The above embodiment has illustrated an example where the through hole 22e is provided in a portion of the first shaft member 20 located on the first axial side (or located in the direction Z1) relative to the rotor core 1, and the through hole 31c is provided in a portion of the second shaft member 30 located on the second axial side (or located in the direction Z2) relative to the rotor core 1. The present disclosure, however, is not limited to this example. The rotor 300 according to the second variation illustrated in FIG. 6, for example, may involve providing a through hole 22e in a portion of the first shaft member 320 located on the first axial side (or located in the direction Z1) relative to the rotor core 1, and providing a through hole 331c in a portion of the first shaft member 320 located on the second axial side (or located in the direction Z2) relative to the rotor core 1.

Third Variation

The above embodiment has illustrated an example where the inner peripheral surface 22a of the extremity 23 of the first shaft member 20 (first shaft member) located on the second axial side (or located in the direction Z2) is connected to the outer peripheral surface 32a of the extremity 33 of the second shaft member 30 (second shaft member) located on the first axial side (or located in the direction Z1). The present disclosure, however, is not limited to this example.

Figure 7:
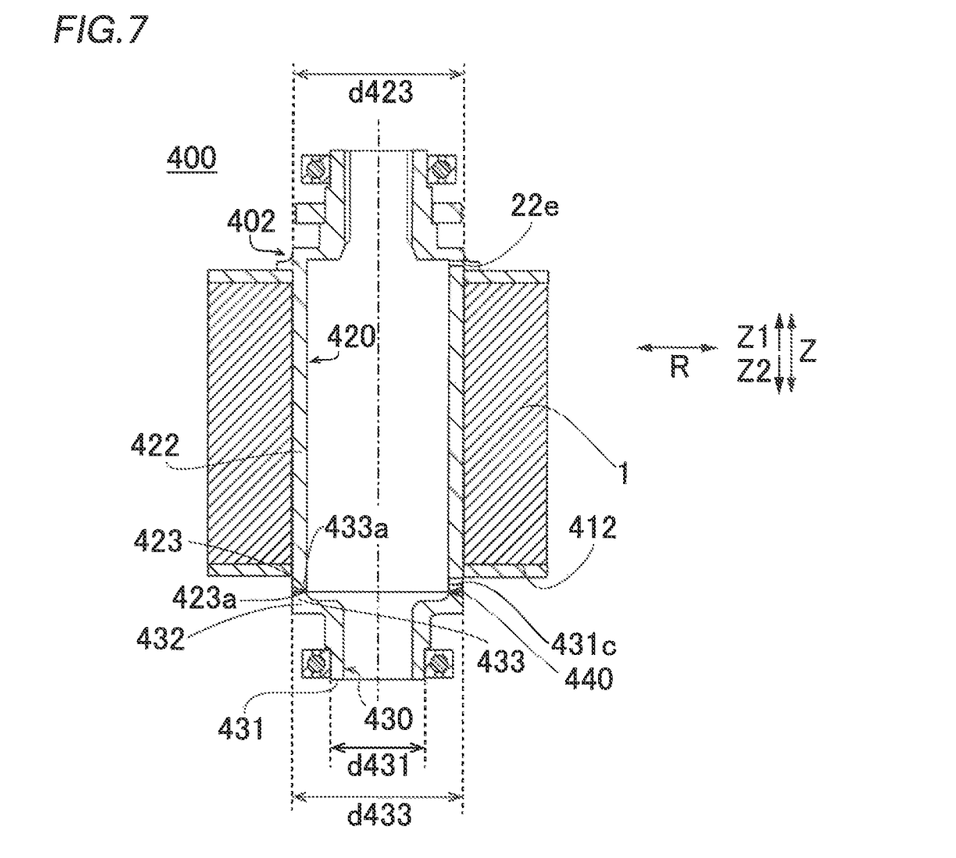
FIG. 7 is a cross-sectional view of a rotor according to a third variation of the present embodiment.

A rotor 400 according to a third variation illustrated in FIG. 7, for example, involves connecting an extremity 433 of a large-diameter portion 432 of a second shaft member 430 located on the first axial side (or located in the direction Z1) to an extremity 423 of a large-diameter portion 422 of a first shaft member 420 located on the second axial side (or located in the direction Z2) by welding. In this case, as illustrated in FIG. 7, an end face 433a of the extremity 433 of the large-diameter portion 432 located in the direction Z1 is connected to an end face 423a of the extremity 423 of the large-diameter portion 422 located in the direction Z2. An outside diameter d433 of the extremity 433 of the large-diameter portion 432 located on the first axial side is larger than an outside diameter d431 of a small-diameter portion 431 of the second shaft member 430 and is equal to an outside diameter d423 of the extremity 423 of the large-diameter portion 422 located on the second axial side. Connection(s) 440 is/are provided on the second axial side relative to an end face 412 of the rotor core 1 located on the second axial side. The connection(s) 440 is/are provided on the second axial side relative to a through hole 431c of the rotor core 1. The first shaft member 420 is an example of the "first shaft member" in the claims. The second shaft member 430 is an example of the "second shaft member" in the claims. The large-diameter portion 422 is an example of the "first large-diameter portion" in the claims. The large-diameter portion 432 is an example of the "second large-diameter portion" in the claims. The small-diameter portion 431 is an example of the "second small-diameter portion" in the claims. The end face 412 is an example of the "second end face" in the claims.

As described above, the extremity 433 of the large-diameter portion 432 of the second shaft member 430 is connected to the extremity 423 of the large-diameter portion 422 of the first shaft member 420 in the axial direction by welding. This variation is thus able to make the outside diameter of a shaft 402 at the connection(s) 440 smaller than when the first shaft member 420 is connected through the connection(s) 440 to the second shaft member 430 such that the first shaft member 420 and the second shaft member 430 are adjacent to each other in the radial direction. Consequently, this variation is able to further reduce the size of the rotor 400.

Other Variations

The above embodiment has illustrated an example where the shaft 2 includes two members (i.e., the first shaft member 20 and the second shaft member 30). The present disclosure, however, is not limited to this example. Alternatively, the shaft may include three or more members. In this case, one of the three or more members disposed farthest to the first axial side is secured to the rotor core and is provided with the driving force transmitter.

The above embodiment has illustrated an example where the shaft 2 is structured such that the first shaft member 20 and the second shaft member 30 each have a hollow shape. The present disclosure, however, is not limited to this example. In one example, the shaft 2 may be structured such that one or both of the first shaft member and the second shaft member 30 has/have a solid shape.

The above embodiment has illustrated an example where the connection(s) is/are provided by welding. The present disclosure, however, is not limited to this example. In one example, portions of the first shaft member 20 and the second shaft member 30 pressure-welded to each other by shrink fitting or cooling fitting, for example, may be provided in the form of connections.

The above embodiment has illustrated an example where the driving force transmitter 21c is provided on the inner peripheral surface 21a. The present disclosure, however, is not limited to this example. Alternatively, the driving force transmitter 21c may be provided on the outer peripheral surface 21b. In this case, the driving force transmitter 21c is provided at an axial position different from the axial positions of the bearing member 4a and the rotational position detector 5.

The above embodiment has illustrated an example where the first shaft member 20 is provided with the small-diameter portion 21 and the large-diameter portion 22. The present disclosure, however, is not limited to this example. Alternatively, the shaft may be structured such that the first shaft member has constant inside and outside diameters.

The above embodiment has illustrated an example where the rotational position detector 5 is provided in the direction Z2 relative to the bearing member 4a. The present disclosure, however, is not limited to this example. Alternatively, the rotational position detector 5 may be provided in the direction Z1 relative to the bearing member 4a.

The above embodiment has illustrated an example where the end plates 3a and 3b are secured to the shaft 2. The present disclosure, however, is not limited to this example. In one example, the end plates 3a and 3b may be secured to the rotor core 1 by welding or swaging.

The above embodiment has illustrated an example where the shaft 2 is provided with the through holes 22e and 31c. The present disclosure, however, is not limited to this example. In one example, the shaft 2 may be provided with either the through hole 22e or the through hole 31c, or may be provided with neither the through hole 22e nor the through hole 31c.

The above embodiment has illustrated an example where the first shaft member 20 and the second shaft member 30 are made of carbon steel. The present disclosure, however, is not limited to this example. Alternatively, at least one of the first shaft member 20 and the second shaft member 30 may be made of a material other than carbon steel (e.g., stainless steel or aluminum).

The above embodiment has illustrated an example where the second shaft member 30 is made of a material lower in rigidity than the material of the first shaft member 20. The present disclosure, however, is not limited to this example. Alternatively, the second shaft member 30 may be made of a material equal in rigidity to or higher in rigidity than the material of the first shaft member 20.

The above embodiment has illustrated an example where the connections 40 are provided separately at equiangular intervals as viewed in the direction Z1. The present disclosure, however, is not limited to this example. Alternatively, the connection(s) 40 may be continuous in the form of a segment of a circle as viewed in the direction Z1.

The above embodiment has illustrated an example where the shaft 2 is structured such that the end plate 3b and the connection(s) 40 are different in axial position. The present disclosure, however, is not limited to this example. Alternatively, the shaft may be structured such that the axial position of the end plate and the axial position of the connection(s) correspond to each other (or overlap with each other as viewed in the radial direction).

DESCRIPTION OF THE REFERENCE NUMERALS

- 1, 201 rotor core
- 2, 402 shaft
- 4a bearing member (first bearing member)
- 4b bearing member (second bearing member)
- 5 rotational position detector
- 11 end face (first end face)
- 12, 412 end face (second end face)
- 13, 213 inner peripheral surface (inner peripheral surface of rotor core)
- 20, 220, 320, 420 first shaft member (first shaft member)
- 21 small-diameter portion (first small-diameter portion)
- 21a, 22a inner peripheral surface (inner peripheral surface of first shaft member)
- 21b outer peripheral surface (outer peripheral surface of first shaft member)
- 21c driving force transmitter
- 22, 422 large-diameter portion (first large-diameter portion)
- 22b outer peripheral surface (driving force transmission outer peripheral surface)
- 22e, 31c through hole
- 23 extremity (extremity of first large-diameter portion)
- 30, 230, 330, 430 second shaft member (second shaft member)
- 31, 431 small-diameter portion (second small-diameter portion)
- 32, 432 large-diameter portion (second large-diameter portion)
- 32a outer peripheral surface (outer peripheral surface of second shaft member)
- 33 extremity (extremity of second large-diameter portion)
- 40, 240, 440 connection
- 100, 200, 300, 400 rotor
- 103 driving force transmission member
- d12 outside diameter (outside diameter of first small-diameter portion)
- d23 outside diameter (outside diameter of extremity of first large-diameter portion)

d32 outside diameter (outside diameter of second small-diameter portion)
d42 outside diameter (outside diameter of extremity of second large-diameter portion)
d51 inside diameter (inside diameter of rotor core)

The invention claimed is:

1. A rotor comprising:
a cylindrical rotor core including a first end face located on a first axial side and a second end face located on a second axial side; and
a shaft that rotates together with the rotor core, wherein the shaft includes
a first shaft member integrally including a first large-diameter portion having a hollow shape and disposed radially inward of the rotor core, and a first small-diameter portion disposed on the first axial side relative to the first end face of the rotor core and continuous with the first large-diameter portion, and
a second shaft member including a second small-diameter portion disposed on the second axial side relative to the second end face of the rotor core,
at least a part of the first small-diameter portion of the first shaft member and at least a part of the second small-diameter portion of the second shaft member each have an outside diameter smaller than an inside diameter of the rotor core,
the first large-diameter portion of the first shaft member includes a driving force transmission outer peripheral surface which is in abutment with an inner peripheral surface of the rotor core and to which a driving force is to be transmitted from the rotor core,
the first small-diameter portion of the first shaft member is provided with a driving force transmitter to transmit the driving force, which is transmitted thereto from the rotor core through the driving force transmission outer peripheral surface, to a driving force transmission member,
a portion of the first shaft member located on the second axial side is provided with a connection connected to the second shaft member,
the connection is located on the second axial side relative to an end of the driving force transmission outer peripheral surface located on the second axial side,
the second shaft member includes a second large-diameter portion disposed on the first axial side relative to the second small-diameter portion and continuous with the second small-diameter portion, and
the connection is located on the second large-diameter portion on the second axial side of end plates of the rotor core.

2. The rotor according to claim 1, wherein the connection is disposed on the second axial side relative to the second end face of the rotor core.

3. The rotor according to claim 1, wherein
a first bearing member supporting the first shaft member is disposed on the first small-diameter portion of the first shaft member, and
a second bearing member supporting the second shaft member is disposed on the second small-diameter portion of the second shaft member.

4. The rotor according to claim 1, wherein
an outside diameter of an extremity of the second large-diameter portion located on the first axial side is larger than the outside diameter of at least the part of the second small-diameter portion and is equal to an outside diameter of an extremity of the first large-diameter portion located on the second axial side, and the extremity of the second large-diameter portion located on the first axial side is connected by welding to the extremity of the first large-diameter portion located on the second axial side.

5. The rotor according to claim 1, wherein
an outside diameter of an extremity of the second large-diameter portion located on the first axial side is larger than the outside diameter of at least the part of the second small-diameter portion and is smaller than an outside diameter of an extremity of the first large-diameter portion located on the second axial side, and
an outer peripheral surface of the extremity of the second large-diameter portion located on the first axial side is connected by welding to an inner peripheral surface of the extremity of the first large-diameter portion located on the second axial side.

6. A rotor manufacturing method comprising:
a first shaft member preparing step involving preparing a first shaft member of a shaft that rotates together with a rotor core, the first shaft member integrally including
a first large-diameter portion having a hollow shape and disposed radially inward of the rotor core having a cylindrical shape, and
a first small-diameter portion disposed on a first axial side relative to a first end face of the rotor core located on the first axial side, the first small-diameter portion being continuous with the first large-diameter portion, at least a part of the first small-diameter portion having an outside diameter smaller than an inside diameter of the rotor core;
a second shaft member preparing step involving preparing a second shaft member of the shaft, the second shaft member including a second small-diameter portion disposed on a second axial side relative to a second end face of the rotor core located on the second axial side, at least a part of the second small-diameter portion having an outside diameter smaller than the inside diameter of the rotor core;
a driving force transmitter providing step involving providing a driving force transmitter on the first small-diameter portion of the first shaft member, the driving force transmitter being configured to transmit a driving force to a driving force transmission member, the driving force being transmitted to the driving force transmitter from the rotor core through a driving force transmission outer peripheral surface of the first large-diameter portion in abutment with an inner peripheral surface of the rotor core;
a connecting step involving connecting the second shaft member to a portion of the first shaft member located on the second axial side by welding at a position located on the second axial side relative to an end of the driving force transmission outer peripheral surface of the first large-diameter portion located on the second axial side; and
a securing step involving securing the shaft to the rotor core, wherein:
the second shaft member includes a second large-diameter portion disposed on the first axial side relative to the second small-diameter portion and continuous with the second small-diameter portion, and
the welding is located on the second large-diameter portion on the second axial side of end plates of the rotor core.

7. The rotor according to claim 2, wherein
a first bearing member supporting the first shaft member is disposed on the first small-diameter portion of the first shaft member, and
a second bearing member supporting the second shaft member is disposed on the second small-diameter portion of the second shaft member.

8. The rotor according to claim 2, wherein
an outside diameter of an extremity of the second large-diameter portion located on the first axial side is larger than the outside diameter of at least the part of the second small-diameter portion and is equal to an outside diameter of an extremity of the first large-diameter portion located on the second axial side, and
the extremity of the second large-diameter portion located on the first axial side is connected by welding to the extremity of the first large-diameter portion located on the second axial side.

9. The rotor according to claim 3, wherein
an outside diameter of an extremity of the second large-diameter portion located on the first axial side is larger than the outside diameter of at least the part of the second small-diameter portion and is equal to an outside diameter of an extremity of the first large-diameter portion located on the second axial side, and
the extremity of the second large-diameter portion located on the first axial side is connected by welding to the extremity of the first large-diameter portion located on the second axial side.

10. The rotor according to claim 7, wherein
an outside diameter of an extremity of the second large-diameter portion located on the first axial side is larger than the outside diameter of at least the part of the second small-diameter portion and is equal to an outside diameter of an extremity of the first large-diameter portion located on the second axial side, and
the extremity of the second large-diameter portion located on the first axial side is connected by welding to the extremity of the first large-diameter portion located on the second axial side.

11. The rotor according to claim 2, wherein
an outside diameter of an extremity of the second large-diameter portion located on the first axial side is larger than the outside diameter of at least the part of the second small-diameter portion and is smaller than an outside diameter of an extremity of the first large-diameter portion located on the second axial side, and
an outer peripheral surface of the extremity of the second large-diameter portion located on the first axial side is connected by welding to an inner peripheral surface of the extremity of the first large-diameter portion located on the second axial side.

12. The rotor according to claim 3, wherein
an outside diameter of an extremity of the second large-diameter portion located on the first axial side is larger than the outside diameter of at least the part of the second small-diameter portion and is smaller than an outside diameter of an extremity of the first large-diameter portion located on the second axial side, and
an outer peripheral surface of the extremity of the second large-diameter portion located on the first axial side is connected by welding to an inner peripheral surface of the extremity of the first large-diameter portion located on the second axial side.

13. The rotor according to claim 7, wherein
an outside diameter of an extremity of the second large-diameter portion located on the first axial side is larger than the outside diameter of at least the part of the second small-diameter portion and is smaller than an outside diameter of an extremity of the first large-diameter portion located on the second axial side, and
an outer peripheral surface of the extremity of the second large-diameter portion located on the first axial side is connected by welding to an inner peripheral surface of the extremity of the first large-diameter portion located on the second axial side.

\* \* \* \* \*